United States Patent [19]

Vasseneix

[11] Patent Number: 5,384,139
[45] Date of Patent: Jan. 24, 1995

[54] METHOD FOR THE PRESERVATION OF FOOD COMPOSITIONS OF THE PANCAKE, FRITTER AND SIMILAR PASTE TYPE

[75] Inventor: André Vasseneix, Saint Denis de l'Hotel, France

[73] Assignee: Denis France, Rennes, France

[21] Appl. No.: 115,784

[22] Filed: Sep. 3, 1993

Related U.S. Application Data

[63] Continuation of Ser. No. 870,763, Apr. 20, 1992, abandoned, which is a continuation of Ser. No. 477,807, Feb. 21, 1990, abandoned.

[30] Foreign Application Priority Data

Jun. 24, 1988 [FR] France ................. 88 08515

[51] Int. Cl.⁶ ......................................... B65D 25/08
[52] U.S. Cl. ................................. 426/128; 426/112; 426/124; 426/399; 426/394; 426/398; 426/411; 206/219
[58] Field of Search ............... 426/128, 120, 115, 112, 426/399–401, 554, 555, 394, 411, 398; 206/219

[56] References Cited

U.S. PATENT DOCUMENTS

| | | | |
|---|---|---|---|
| 2,631,521 | 3/1953 | Atkins | 426/120 |
| 2,652,148 | 9/1953 | Pfeifer | 426/120 |
| 2,786,769 | 3/1957 | Greenspan | 426/112 |
| 2,824,010 | 2/1958 | Pedersen | 426/120 |
| 2,828,858 | 4/1958 | Tooke | 426/124 |
| 2,899,318 | 8/1959 | Long | 426/112 |
| 2,931,731 | 4/1960 | Pohjola | 426/120 |
| 2,965,500 | 12/1960 | Sanger . | |

(List continued on next page.)

FOREIGN PATENT DOCUMENTS

| | | | |
|---|---|---|---|
| 704569 | 3/1965 | Canada | 426/112 |
| 0232814 | 8/1987 | European Pat. Off. . | |
| 1111754 | 9/1954 | France | 426/120 |
| 1355629 | 2/1963 | France | 426/120 |
| 2198462 | 3/1974 | France . | |
| 2507573 | 6/1982 | France . | |
| 1098342 | 1/1961 | Germany | 426/120 |
| 471544 | 6/1969 | Switzerland . | |
| 203661 | 3/1924 | United Kingdom . | |
| 796499 | 6/1958 | United Kingdom | 426/128 |
| 1180059 | 2/1970 | United Kingdom | 426/120 |

OTHER PUBLICATIONS

Baking Technology & Engineering 2nd Ed Matz AVI Publ. 1972 pp. 108–117.
Bakery Materials and Methods Daniel MacLaren & Sons 1963 pp. 252–265.
Baking Science & Technology vol. 1 Pyler Siebel Publ. pp. 514–545.
Food Products Formulary vol. 2 Tressler et al AVI Publ. 1975 pp. 371, 372.
Food Engineering Feb. 1956 p. 148.

*Primary Examiner*—Steven Weinstein
*Attorney, Agent, or Firm*—Pollock, Vande Sande & Priddy

[57] ABSTRACT

A method for ensuring the long term preservation of food compositions of the paste type containing essentially cereal flour, eggs, sugar, milk or a milk substitute such as a soya bean alimentary filtrate and flavoring products, according to which the paste constituents are distributed into two phases, a powder phase and a sterilized liquid phase, wherein the powder phase includes the whites of egg in addition to the flour and sugar, and the liquid phase includes the yolks in addition to the other constituents, each of these phases being introduced in a distinct packing, conveniently prepared, notably aseptized, with a view to a long preservation of the phase it contains.

2 Claims, 1 Drawing Sheet

U.S. PATENT DOCUMENTS

| | | | |
|---|---|---|---|
| 2,980,540 | 4/1961 | Turpin | 426/112 |
| 3,039,644 | 6/1962 | Lefcort | 426/112 |
| 3,144,931 | 8/1964 | Long | 426/112 |
| 3,156,352 | 11/1964 | Hayhurst | 426/120 |
| 3,160,507 | 12/1964 | Finucane | 426/120 |
| 3,282,412 | 11/1966 | Corella et al. | 426/112 |
| 3,305,368 | 2/1967 | Fourelle | 426/120 |
| 3,326,363 | 6/1967 | Bennett et al. | 426/120 |
| 3,533,807 | 10/1970 | Wakefield | 426/112 |
| 3,542,566 | 11/1970 | Wakefield | 426/112 |
| 3,547,658 | 12/1970 | Melnick | 426/120 |
| 3,589,272 | 6/1971 | Bouladon | 426/112 |
| 3,598,609 | 8/1971 | Hoynak | 426/115 |
| 3,655,405 | 4/1972 | Karas et al. | 426/120 |
| 3,741,383 | 6/1973 | Wittwer | 426/120 |
| 3,743,520 | 7/1973 | Croner | 426/120 |
| 3,753,734 | 8/1973 | Kaplow et al. | 426/128 |
| 3,779,372 | 12/1973 | Delloret et al. | 426/115 |
| 3,970,763 | 7/1976 | Moran et al. | 426/399 |
| 4,074,827 | 2/1978 | Labe | 426/120 |
| 4,221,291 | 9/1980 | Hunt | 426/120 |
| 4,397,879 | 8/1983 | Wilson | 426/128 |
| 4,408,690 | 10/1983 | Ferrero | 426/120 |
| 4,557,377 | 12/1985 | Maloney | 426/112 |
| 4,634,003 | 1/1987 | Ueda et al. | 426/120 |
| 4,803,086 | 2/1989 | Hedenberg | 426/112 |
| 4,803,088 | 2/1989 | Yamamoto et al. | 426/120 |

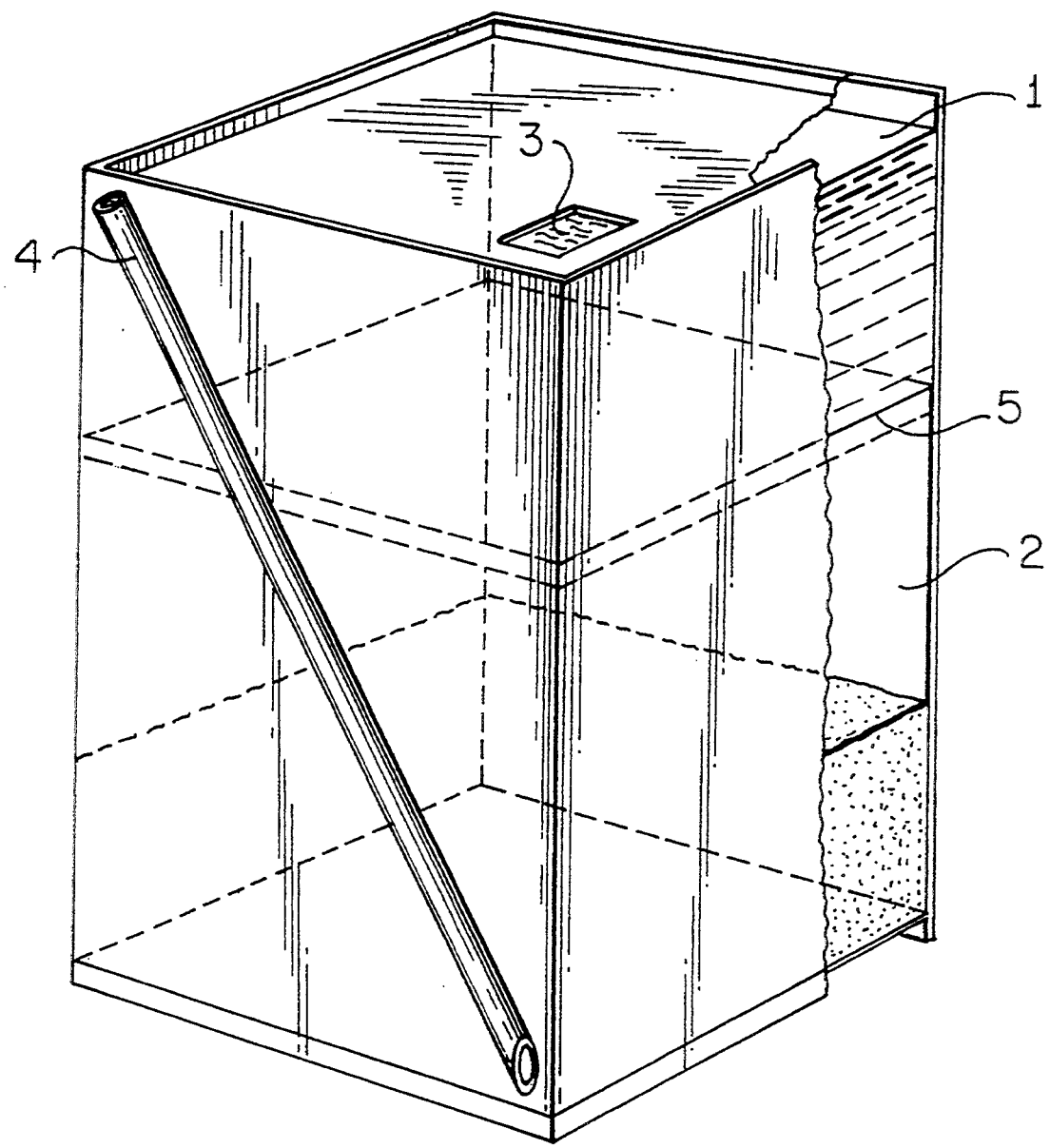

METHOD FOR THE PRESERVATION OF FOOD COMPOSITIONS OF THE PANCAKE, FRITTER AND SIMILAR PASTE TYPE

This application is a continuation-in-part, of Ser. No. 07/477,807 filed on Feb. 21, 1990 now abandoned. This application is a continuation-in-part, of Ser. No. 07/870,763 filed on Apr. 20, 1992 now abandoned.

BACKGROUND OF THE INVENTION

The present invention relates to a method allowing a long preservation of food compositions of the pancake, fritter, blini and similar paste type.

It is known that in the composition of pastes of this type are constituents of two kinds are included,
on the one hand, flour, whatever its origin, for example, wheat and buckwheat the starch they contain causing, during the cooking of the paste, a cross-linking phenomenon imparting to the products obtained a very particular texture;
on the other hand, elements more easily soluble in water, such as eggs, sugar, salt, milk and/or soya bean alimentary filtrate, and flavoring products.

The problem with which one is confronted in providing long term preservation of compositions of this kind comes from the fact that taking in account the legal provisions governing the matter, there is required a total sterilization by heating at a high temperature:
either, presently, 115° C. for 10 min.
or, 145° C. during 3 min, There is caused as soon as a temperature of 60° C. is reached the destruction of the starch grains, making them unsuitable for the cross-linking which has just been mentioned, and making impossible the formation of the desired products.

It should be added that in addition to the legal impossibility of having recourse to the addition to the composition of conservators, antibiotic or others, it is practically not possible to call upon sophisticated techniques such as ionization, because of their prohibitive cost, without the certainty of obtaining a total sterility.

SUMMARY OF THE INVENTION

The invention allows solving the problem thus posed in a particularly simple and economic way.

It consists essentially in distributing into two phases the constituents of the paste: a powder phase including the whites of egg in addition to flour and sugar, and a liquid phase including the yolks in addition to the other constituents, each of these phases being introduced in a distinct packing, conveniently prepared, notably aseptized, with in view the long term preservation of the phase which it contains.

Each packing consists in a packing of the aseptic type, the atmosphere in the one which contains the flour being chemically inert, preferably made of an inert gas.

The reunion of the two phases is provided, in an extemporaneous manner, by means of the instructions supplied to the consumer.

BRIEF DESCRIPTION OF THE DRAWING

The FIGURE is an isometric view of a package adapted for long term preservation of food compositions in accordance with the present invention

DETAILED DESCRIPTION OF THE INVENTION

The method according to the invention can be advantageously put in practice by means of packaging, an embodiment of which is being described hereafter with reference to the accompanying drawing, it being made clear that it is only a non limiting example:

In this example, the packaging is made of two superimposed enclosures, made of any appropriate material, the upper enclosure 1 containing the liquid phase and the lower enclosure 2 containing the powder phase. These enclosures are assembled by any means so as to obtain a tight homogeneous block.

The upper enclosure is formed with an orifice 3, closed by a lid made of a material allowing an easy perforation, by means of a stick 4, attached outside the package.

The lower enclosure is separated from the upper enclosure by a membrane 5, also in a material (an aluminium foil for example) adapted for being easily perforated by means of stick 4.

The volume of the lower enclosure is determined so as to form a space for containing the powder phase, and a space corresponding to the volume of liquid contained in the enclosure 1. In addition, an extra space is provided so that, during use, and once the orifice 3 has been uncovered and surface 5 separating the two enclosures has been perforated, and once the mixture of the two phases has been thus effected, one may complete this mixture by stirring the medium without necessary overflow.

Of course, the invention is in no way limited to the example treated and can be the object of many variants without departing from its scope.

I claim:

1. A method for extending the shelf life of a batter composition including flour, egg yolks, egg whites, and a liquid, said method comprising the steps:
   preparing a powder phase including dried egg whites, and flour having unaltered starch grains which are capable of cross linking during batter cooking;
   preparing a sterilized liquid phase including egg yolks and the liquid;
   aseptically packaging the prepared powder phase, containing the unaltered starch grains, in a first packaging enclosure;
   sealing the first enclosure with an inert gas atmosphere therein;
   aseptically packaging the liquid phase in a second packaging enclosure; and
   then storing the phases separately, in a single packaging unit, with the flour being maintained such that the starch grains remain unaltered and capable of cross-linking when the phases are mixed and the resulting batter is cooked;
   the phases, present in the first and second packaging enclosures, remaining separated therein, and being of sufficient composition to form a cooking batter upon mixing of the phases.

2. A package for preserving batter ingredients, the package comprising: a lower aseptically packaged enclosure, filled with an inert gas atmosphere, the lower enclosure containing a powder phase comprising dried egg whites, and flour having unaltered starch grains which are capable of cross linking during batter cooking;

an upper aseptically packaged enclosure containing a sterilized liquid phase including egg yolks and liquid;

the phases being present in amounts sufficient to form a cooking batter upon mixing the two phases;

a perforatable membrane separating the powder and liquid phases thereby permitting the phases to be mixed when the batter is to be prepared;

a lid defining the top of the upper enclosure and having an opening formed therein; and a perforatable member normally closing the opening;

wherein a stirring member can perforate the perforatable member and the membrane, to allow stirring of the phases within the container, to form a cooking batter.

* * * * *